Figure 1:
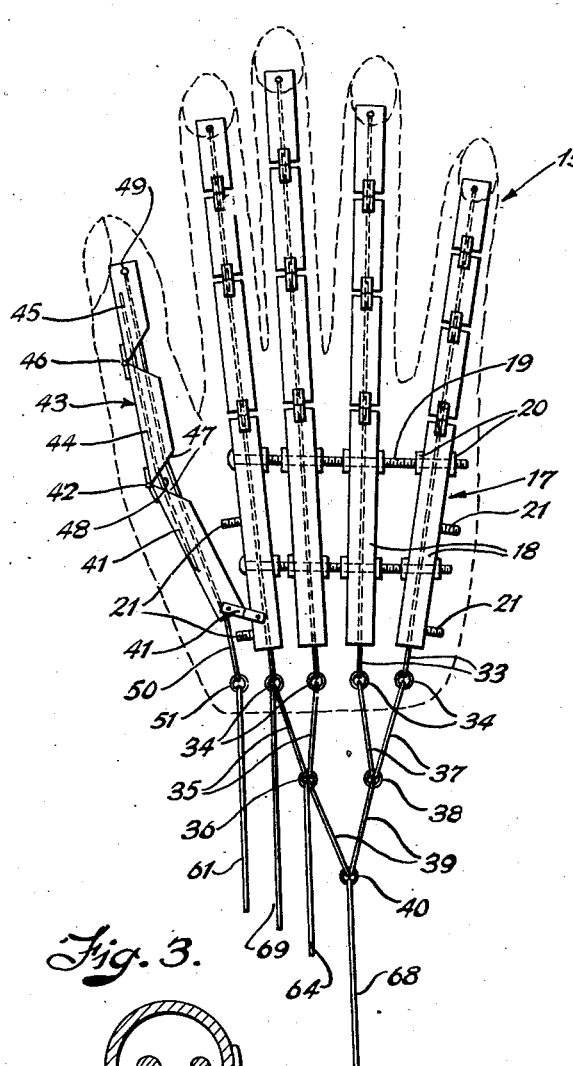

Feb. 10, 1948.    G. R. TUREMAN, JR    2,435,614
ARTIFICIAL HAND
Filed July 9, 1945    2 Sheets-Sheet 1

Inventor
Garnet R. Tureman Jr.

By Clarence A. O'Brien
and Harvey B. Jacobson
Attorneys

Feb. 10, 1948. G. R. TUREMAN, JR 2,435,614
ARTIFICIAL HAND
Filed July 9, 1945 2 Sheets-Sheet 2
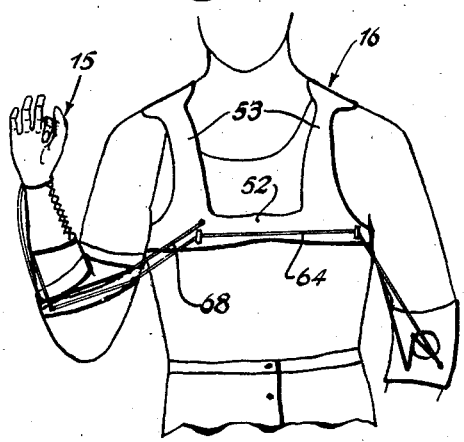
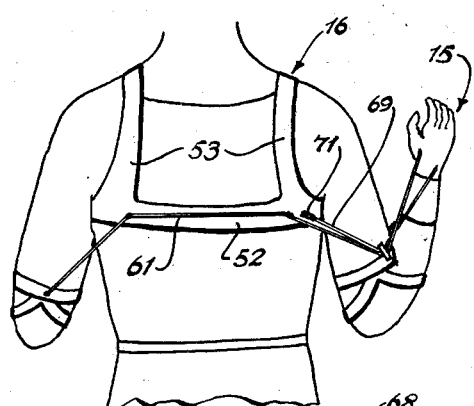
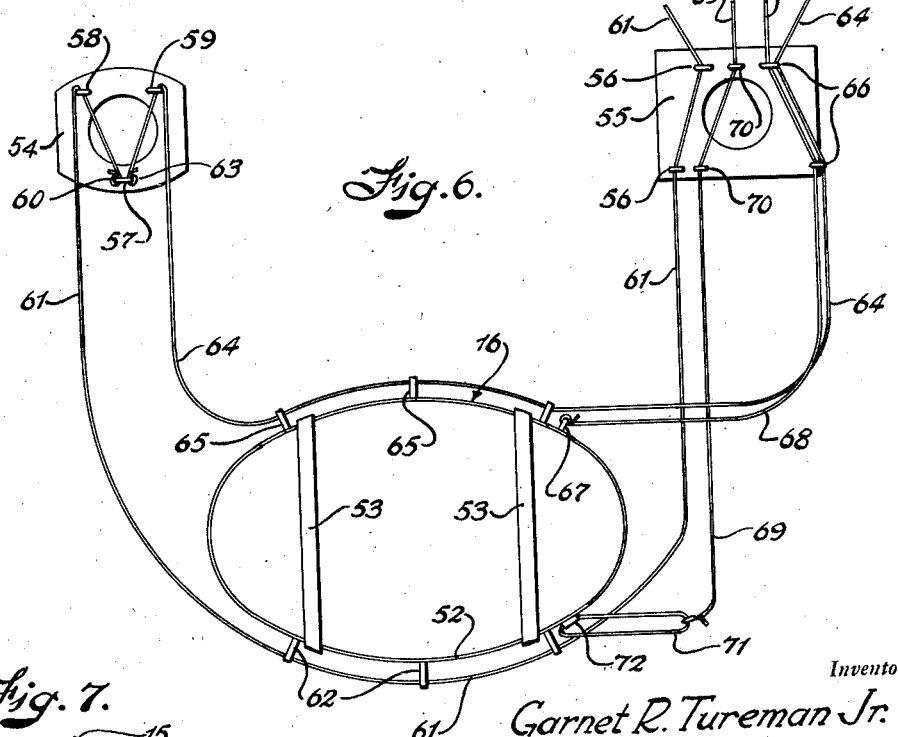
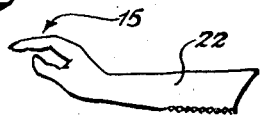
Inventor
Garnet R. Tureman Jr.
By Clarence A. O'Brien
and Harvey B. Jacobson
Attorneys Patented Feb. 10, 1948

2,435,614

UNITED STATES PATENT OFFICE 2,435,614

ARTIFICIAL HAND

Garnet R. Tureman, Jr., Augusta, Ga.

Application July 9, 1945, Serial No. 603,781

2 Claims. (Cl. 3—12)

This invention relates to improvements in artificial members adapted to be used in place of a natural body member which has been lost through amputation or otherwise.

The primary object of the invention is to provide a substitute member which is adapted to be attached to the stump resulting from the amputation so as to restore to the amputated member its lost function.

Another object of the invention is to simulate not only in appearance, but also in function, the lost member so that one suffering the loss of a body member may perform the normal functions with little or no appreciable effort, above that which would be normally exerted in manipulating the natural member.

The above and other objects may be attained by employing this invention which embodies among its features an artificial hand which includes a rigid palm member having attached thereto articulated digit members so arranged as to simulate the natural movements of the original digits and means to selectively govern the flexing of the digit members whereby the natural movements of the original digits will be simulated.

Other features embody means to regulate the divergence of the digit members so as to space them from one another to reproduce the angular disposition of the digits of the lost member.

Other features embody a harness adapted to be worn on the person of the user of the hand and cables carried by the harness and so connected thereto that by certain movements of certain portions of the person of the wearer selective flexing of the digit members may be accomplished.

Other features include means selectively to flex all of the digits or only certain of them according to the desire of the user.

Figure 2:
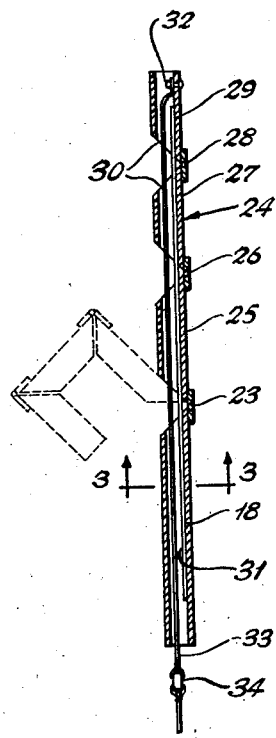
Figure 3:
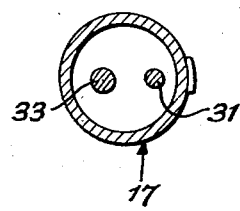

In the drawings:

Figure 1 is a plan view of the palm unit showing the articulated digit members in proper position thereon, Figure 2 is a longitudinal sectional view through one of the digit members and its respective palm member, Figure 3 is an enlarged transverse sectional view through Figure 2, Figure 4 is a front view of the figure of a person showing the harness which is employed, Figure 5 is a rear view of the harness, Figure 6 is a diagrammatic view showing the cable connections for manipulating the digits of the artificial member, and Figure 7 is a side view of the hand showing the mounting cuff by which it is attached to the stump from which the natural member has been lost.

Briefly, my invention includes two separate and distinct units, namely, the hand designated generally 15, and the harness designated generally 16.

The hand 15 comprises a palm unit designated generally 17 which is composed of a plurality of rigid tubular members 18 held in spaced divergent relation by means of transversely extending screws 19 carrying adjusting nuts 20 on opposite sides of the tubular members 18 so that the angular relation of the tubular members one to another may be regulated to simulate the angular relation of the bones in the palm of the hand. Carried on the outer tubular members 18 are threaded studs 21 by means of which the hand may be attached to the mounting cuff 22 (Fig. 7) which is adapted to be laced or otherwise attached to the stump from which the member has been amputated.

Pivoted, as at 23, to the outer divergent end of each tubular member 18 is an articulated digit-supporting member designated generally 24, each of which comprises a tubular unit 25, one end of which is pivoted at 23 to the tubular member 18, while the opposite end is pivoted, as at 26, to a somewhat shorter tubular member 27 carrying at its outer end a pivot 28 to which the end tubular member 29 of the digit is attached. As illustrated in Figure 2, the adjacent ends of each of the tubular members 18, 25, 27 and 29 are cut away, as at 30, to permit the digit member 24 to flex, as illustrated in the dotted lines in Figure 2. Extending longitudinally through the tubular member 18 and the members 25, 27 and 29 is a leaf spring 31 which normally tends to hold the digit member 24 extended, but which is adapted to yield to permit the flexing of the digit member 24, as shown. Attached, as at 32, adjacent the outer end of the tubular member 29 is a cord or flexible member 33 which extends through the tubular members to a point beyond the convergent ends of the tubular members 18. Each flexible member carries at its end opposite that attached to the tubular member 29 an eye 34 to which the control cables, to be more fully hereinafter described, are adapted to be connected. In the preferred embodiment of the invention, the eyes 34 of the index finger digit member 24 and the eye 34 of the middle finger digit member 24 are provided with links 35 which coverge and are connected together at their opposite ends by an eye 36. Likewise, the eyes 34 of the third or ring finger digit member 24 and of the little finger digit member 24 are connected together by links 37 which converge to an eye 38. It will thus be seen that upon applying pull to either of the eyes 36 or 38, the index finger and the middle finger will be moved in unison, or the ring finger and little finger will likewise be moved in unison. In order that all fingers may be moved in unison, links 39 are connected to the eyes 36 and 38 and converge to an eye 40 so that when pull is exerted on the eye 40, the flexible members 33 will be moved in such a manner as to flex the digit members 24 in unison, as suggested in the dotted lines in Figure 2.

Attached by a suitable bracket 41 to the palm unit 17 and extending divergently from the rear or wrist end of the tubular member 18 carrying the digit member 24 of the index finger is a tubular member 41' to the outer end of which is pivoted, as at 42, an articulated thumb member designated generally 43. This thumb member comprises a pair of tubular members 44 and 45 which are joined together by a pivot 46, and the tubular members 41', 44 and 45 are cut away, as at 47, to permit the thumb member 43 to flex against the influence of a leaf spring 48 which extends longitudinally through the tubular members 41', 44 and 45. Connected at 49 adjacent the outer end of the tubular member 45 is a flexible member 50 which extends beyond the innermost end of the tubular member 41' and terminates in an eye 51 adjacent the eyes 34. It is to be noted that the thumb member 43 is disposed in such a position that the axes of the pivots 42 and 46 are at an angular position with relation to the axes of the pivots of the digit members 24 so that when the fingers are flexed and the thumb is also flexed, the movement of the fingers will be in planes intersecting the plane of movement of the thumb. In this way a gripping effect on an object may be achieved which simulates to a very great extent the action of the natural member.

The harness 16, previously mentioned, constitutes the second element of importance and comprises a body strap 52 which is adapted to encircle the chest and back of the user immediately below the arm pits. The body strap 52 is supported in proper position by suitable shoulder straps 53, and cooperating with the body strap in the manipulation of the hand is a cuff 54 which is adapted to be worn on the arm opposite that to which the artificial hand is attached. A suitable cuff 55 is adapted to embrace the stump upon which the artificial member is attached and will hereafter be referred to as the guide cuff, while the cuff 54 is better described as an operating cuff. The guide cuff 55 is provided with a plurality of guide eyes 56 through which the various control cables are directed to the artificial member, as will be more fully hereinafter described. The control cuff 54 is provided with an anchoring eye 57 and guide eyes 58 and 59, respectively. Attached, as at 60, to the anchoring eye 57 is a control cable 61 which is led through the eye 58 up to the arm of the wearer and through guide eyes 62 carried by the back of the strap 52. The cable 61 is led through the guide eyes 62 across the back of the wearer and thence toward the free end of the stump and through the guide eyes 56 on the guide cuff 55 toward the artificial member. The end of the cable 61 opposite that connected to the eye 57 is attached to the eye 51 of the thumb member 43 so that when the control cuff 54 is moved in such a manner as to exert pull on the cable 61, the thumb member 43 will be flexed. Anchored to the eye 57, as at 62, is a control cable 63 which is led up the arm to the front of the strap 52 upon which guide eyes 65 are attached. The cable 64 is carried across the chest of the user and down the opposite arm toward the artificial member to the cuff 55 and through guide eyes 66 in the direction of the artificial member. The end of the cable 64 opposite that attached at 63 to the eye 57 is connected to the eye 36 of the artificial member so that when pull is exerted on the cable 64 by the manipulation of the cuff 54, the index and middle finger digit members 24 will be flexed. Anchored to a suitable eye carried by the body strap 52 adjacent the member to which the artificial member is attached, as at 67, is a cable 68 which is led through the eyes 66 on the guide cuff 54 and is connected at its opposite end to the eye 40 of the artificial member 15 so that when pull is exerted on the cable 68, all of the fingers of the artificial member will be flexed. In order to control the movement of the index finger of the artificial member 15, a cable 69 is attached to the eye 34 attached to the flexible member 33 of the index digit member 24 and leads through guide eyes 70 carried by the guide cuff 55 to a loop 71 which is anchored, as at 72, to the body strap 52 adjacent the amputated member. It will thus be seen that when the body is so moved as to exert pull on the cable 69, the index finger will be flexed.

It is obvious that by changing the combination of the cables 61, 64, 68 and 69, different digits of the artificial hand may be moved and various combinations of movement may be achieved, but for general purposes, it has been found that the cable arrangement above set forth will serve adequately.

The digit members 24 and the palm member 17, as well as the thumb member 43, are all adapted to be suitably padded and covered with a flexible casing to simulate the appearance and cushioning effect of the lost member and the parts may be so correlated and manipulated that the artificial member may be used without embarassment due to its inconspicuous nature.

While in the foregoing there has been shown and described the preferred embodiment of this invention, it is to be understood that minor changes in the details of construction, combination and arrangement of parts may be resorted to without departing from the spirit and scope of the invention as claimed.

I claim:

1. An artificial hand which includes a palm-supporting unit comprising a plurality of divergent tubular palm members, a tubular articulated finger member pivotally attached at the divergent end of each tubular palm member, resilient means to hold each finger member extended in longitudinal alignment with its respective palm member, means to cause each finger member to flex against the effort of the resilient means, and means to vary the divergence of the palm and finger members.

2. An artificial hand which includes a palm-supporting unit comprising a plurality of divergent tubular palm members, a tubular articulated finger member pivotally attached at the divergent end of each tubular palm member, resilient means to hold each finger member extended in longitudinal alignment with its respective palm member, means to cause each finger member to flex against the effort of the resilient means, bolts extending transversely through the palm members, and nuts on the bolts for engaging opposite sides of the palm members whereby the divergence of the palm members and of the finger members may be varied.

GARNET R. TUREMAN, JR.

REFERENCES CITED

The following references are of record in the file of this patent:

UNITED STATES PATENTS

| Number | Name | Date |
| --- | --- | --- |
| 1,304,099 | Robinson | May 20, 1919 |
| 1,465,933 | Dedic | Aug. 28, 1923 |
| 1,507,683 | Pecorella et al. | Sept. 9, 1924 |
| 1,587,780 | Laherty | June 8, 1926 |